United States Patent
Puckett et al.

(10) Patent No.: US 8,909,457 B2
(45) Date of Patent: Dec. 9, 2014

(54) DUAL FUEL COMMON RAIL SYSTEM AND METHOD OF TRANSITIONING FROM DIESEL ONLY TO DUAL FUEL METHOD OF OPERATION

(71) Applicant: Caterpillar Inc., Peoria, IL (US)

(72) Inventors: Daniel Puckett, Peoria, IL (US); Steven Thomas Grant, Groveland, IL (US); Frank Lombardi, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 156 days.

(21) Appl. No.: 13/732,619

(22) Filed: Jan. 2, 2013

(65) Prior Publication Data

US 2014/0188372 A1    Jul. 3, 2014

(51) Int. Cl.
*F02D 19/10* (2006.01)
*F02D 19/06* (2006.01)

(52) U.S. Cl.
CPC ............... *F02D 19/0615* (2013.01)
USPC ....... 701/107; 701/104; 123/27 GE; 123/526; 123/690; 123/479

(58) Field of Classification Search
CPC ..... F02D 19/10; F02D 41/22; F02D 41/0027; F02D 41/3076
USPC .............. 701/104, 107; 123/27 GE, 525, 526, 123/479, 690
See application file for complete search history.

(56) References Cited

U.S. PATENT DOCUMENTS

| | | | | |
|---|---|---|---|---|
| 4,499,885 | A * | 2/1985 | Weissenbach et al. | 123/525 |
| 6,240,910 | B1 * | 6/2001 | Maekawa et al. | 123/529 |
| 6,467,466 | B1 * | 10/2002 | Maekawa et al. | 123/529 |
| 7,627,416 | B2 | 12/2009 | Batenburg et al. | |
| 7,836,865 | B2 | 11/2010 | Joos et al. | |
| 7,913,673 | B2 | 3/2011 | Vanderslice et al. | |
| 2012/0055457 | A1 | 3/2012 | Wong et al. | |
| 2012/0285417 | A1 * | 11/2012 | Kim et al. | 123/299 |
| 2012/0325180 | A1 * | 12/2012 | Montgomery | 123/299 |
| 2013/0311067 | A1 * | 11/2013 | Stockner et al. | 701/104 |

* cited by examiner

*Primary Examiner* — Erick Solis
(74) *Attorney, Agent, or Firm* — Liell & McNeil Attorneys, PC (57) ABSTRACT

A dual fuel common rail system may be operated in a regular mode in which a relatively large charge of gaseous fuel is ignited by compression igniting a relatively small injection quantity of liquid diesel fuel. The dual fuel system may be operated in a single fuel limp home mode in which liquid diesel fuel is injected at higher pressures. When transitioning from the single fuel limp home mode to the dual fuel regular mode, accumulated leaked liquid fuel in the gaseous nozzle chamber of each fuel injector is purged and burned in the respective engine cylinder.

20 Claims, 6 Drawing Sheets

DUAL FUEL COMMON RAIL SYSTEM AND METHOD OF TRANSITIONING FROM DIESEL ONLY TO DUAL FUEL METHOD OF OPERATION

TECHNICAL FIELD

The present disclosure relates generally to dual fuel common rail systems, and more particularly to a method of transitioning from a diesel only method of operation to a diesel and gaseous fuel method of operation.

BACKGROUND

One relatively new class of engines seeks to utilize two different fuels to gain the efficiencies associated with compression ignition combined with the advantages associated with burning natural gas fuel. In particular, one type of dual fuel engine utilizes a small pilot injection quantity of liquid diesel fuel that is compression ignited to in turn ignite a much larger charge of natural gas fuel in each engine cylinder. In one strategy for this type of engine, both fuels are directly injected from a single fuel injector associated with each engine cylinder. For instance, U.S. Pat. No. 7,627,416 appears to teach a dual fuel common rail system in which liquid diesel fuel and natural gas fuel are both injected from a single fuel injector associated with each engine cylinder. This reference recognizes that there may be instances in which the engine will need to operate solely on liquid diesel fuel due to exhaustion of the natural gas fuel supply or possibly some fault in the natural gas portion of the system. However, this reference fails to recognize the problems and challenges associated with transitioning from operating the dual fuel common rail system in a diesel only fueling mode back to a regular dual fuel mode.

The present disclosure is directed toward one or more of the problems set forth above.

SUMMARY

A method of operating a dual fuel engine includes operating a dual fuel system in a regular mode and a limp home mode. Liquid fuel is accumulated in a gaseous nozzle chamber of each fuel injector of the dual fuel system over a plurality of engine cycles when operating in the limp home mode. The accumulated liquid fuel is displaced with gaseous fuel when transitioning from the limp home mode to the regular mode. Liquid fuel is injected from a first nozzle outlet set and gaseous fuel injected from a second nozzle outlet set into an engine cylinder when operating the dual fuel system in the regular mode. Liquid fuel is injected from the first nozzle outlet set but gaseous fuel is not injected from the second nozzle outlet set into the engine cylinder when operating the dual fuel system in the limp home mode. Liquid fuel is injected from the first nozzle outlet set and accumulated liquid fuel is injected from the second nozzle outlet set into the engine cylinder during the transitioning step.

In another aspect, a dual fuel common rail system includes a plurality of fuel injectors that are each fluidly connected to each of a gaseous fuel common rail and a liquid fuel common rail. Liquid fuel supply and pressure control devices are fluidly connected to the liquid fuel common rail. Gaseous fuel supply and pressure control devices are fluidly connected to the gaseous fuel common rail. An electronic controller is in control communication with the plurality of fuel injectors, the liquid fuel supply and pressure control devices and the gaseous fuel supply and pressure control devices. The electronic controller includes a limp home algorithm configured to communicate liquid injection control signals to inject liquid fuel from a first nozzle outlet set, and includes a regular algorithm configured to communicate liquid injection control signals to inject liquid fuel from the first nozzle outlet set and gaseous injection control signals to inject gaseous fuel from a second nozzle outlet set. The electronic controller also includes a transitioning algorithm configured to generate gaseous injection control signals to inject accumulated liquid fuel in a gaseous nozzle chamber of each of the fuel injectors from the second nozzle outlet set.

DETAILED DESCRIPTION

Figure 1:
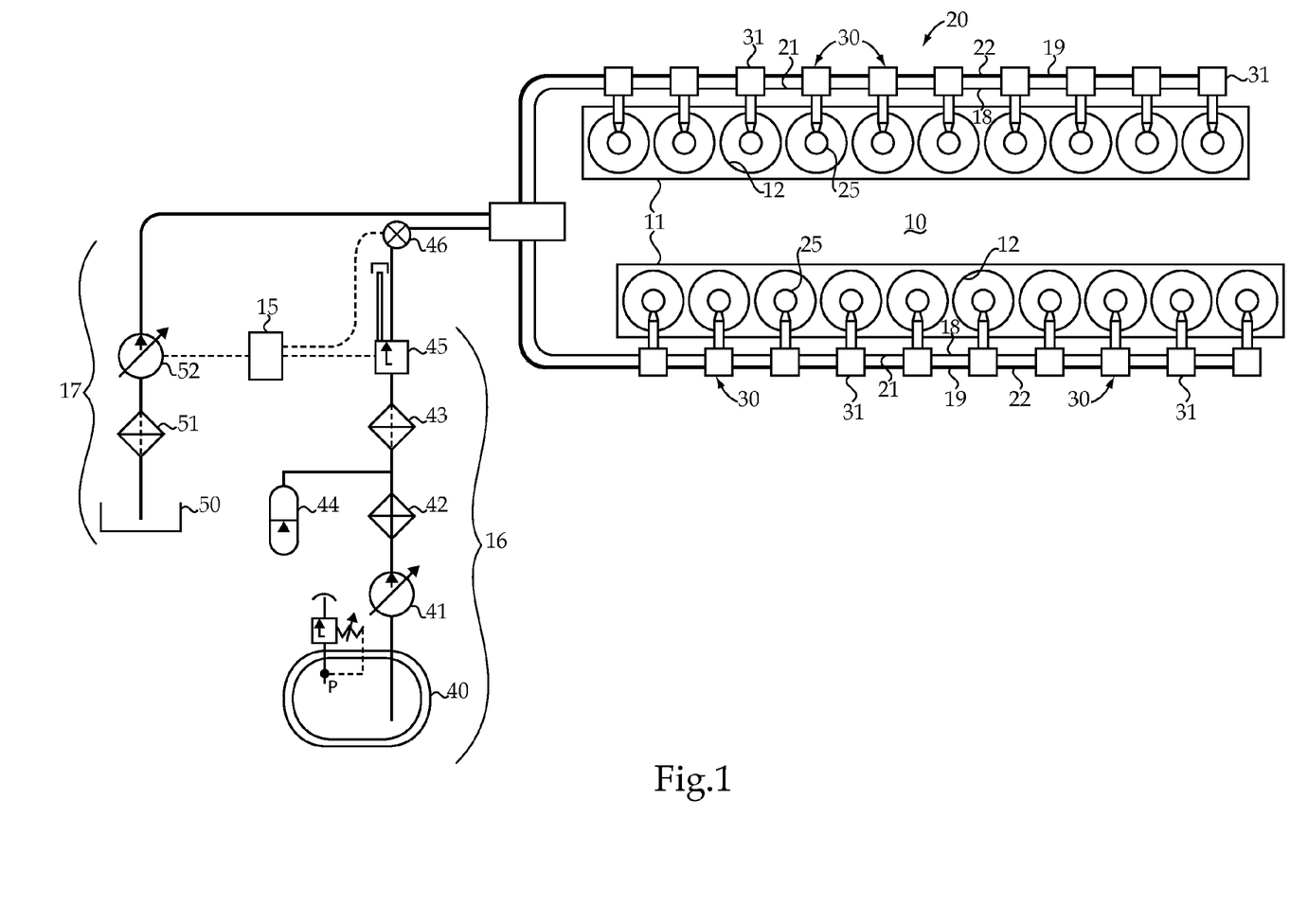
FIG. 1 is a schematic view of a dual fuel engine according to the present disclosure.
Figure 2:
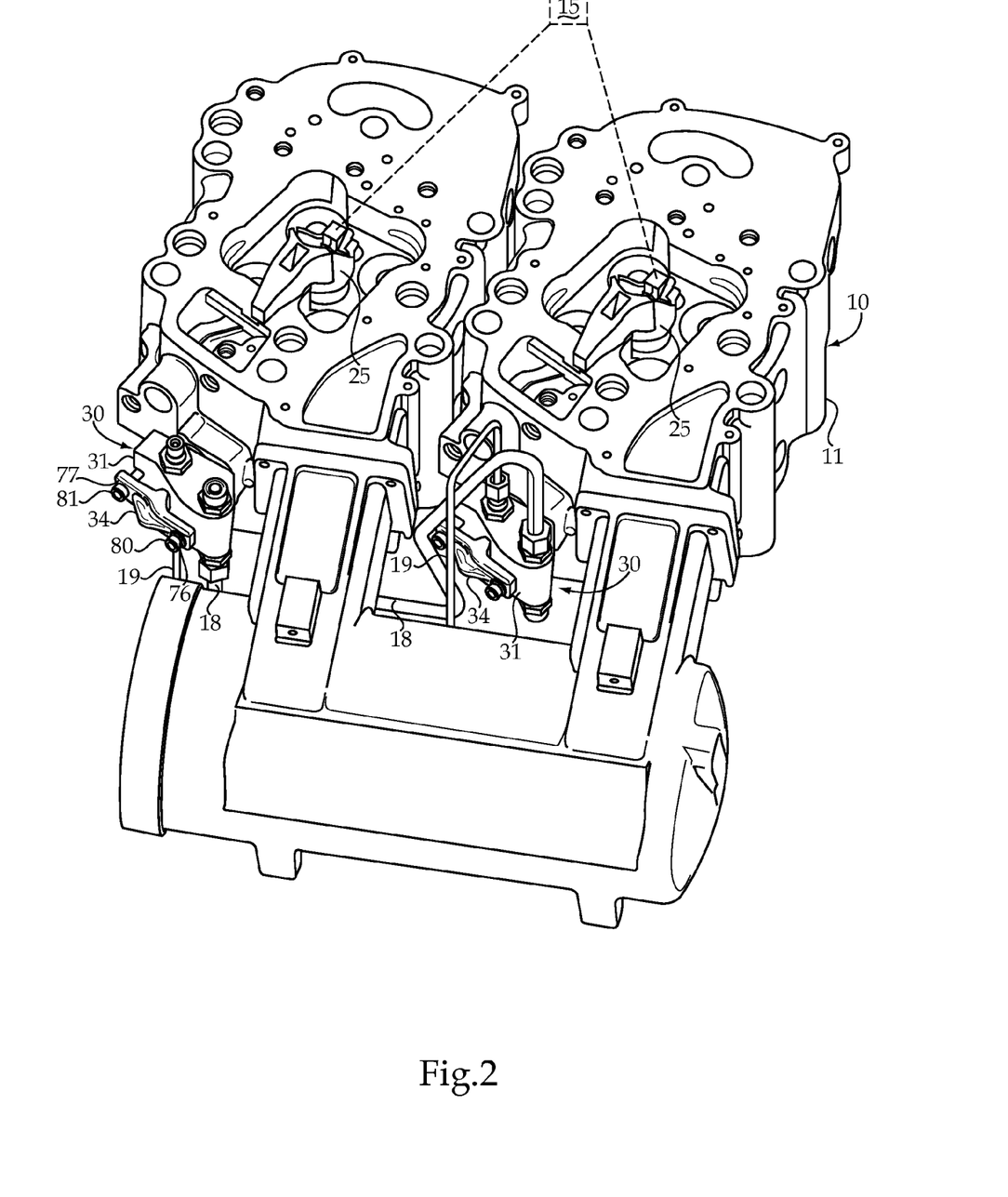
FIG. 2 is a perspective view of a portion of the engine and dual fuel common rail system for the engine of FIG. 1.
Figure 3:
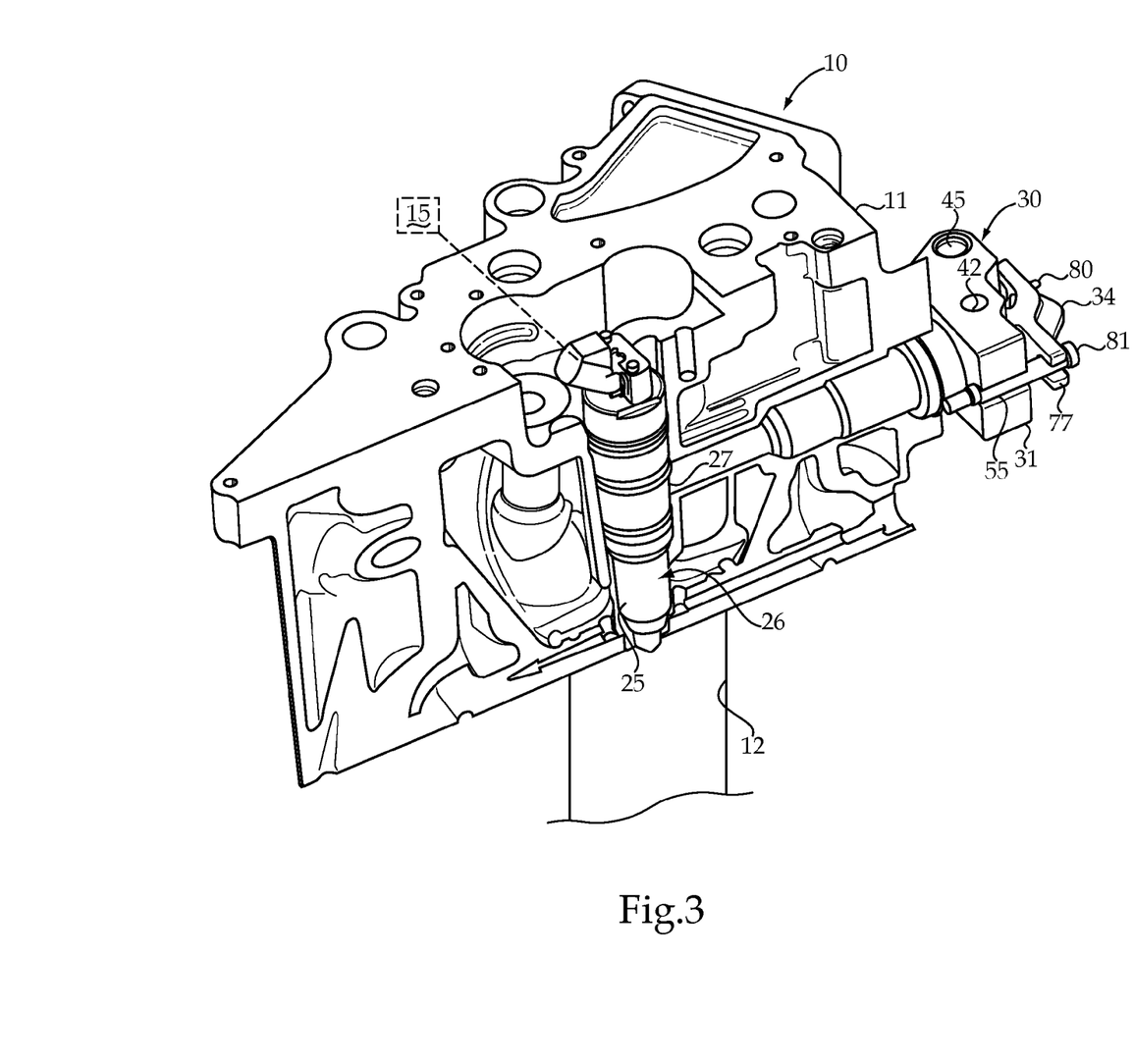
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 fluidly connected to the gaseous fuel common rail 21 as well as liquid supply and pressure control devices 17 fluidly connected to the liquid fuel common rail 22. Each of the fuel injectors 25, the gas pressure supply and control devices 16 and the liquid supply and pressure control devices 17 are in control communication with, and controlled by, an electronic engine controller 15 in a known manner. The gas supply and pressure control devices 16 may include a pressurized cryogenic liquefied natural gas tank 40 with an outlet fluidly connected to a variable delivery cryogenic pump 41. Devices 16 may also include a heat exchanger 42, an accumulator 44, a gas filter 43 and a fuel conditioning module 45 that controls the supply to, and pressure in gaseous fuel common rail 21. The liquid supply and pressure control devices 17 may include a diesel fuel tank 50, fuel filters 51 and an electronically controlled high pressure fuel pump 52 that supply liquid fuel to, and control pressure in, liquid fuel common rail 22.

Figure 4:
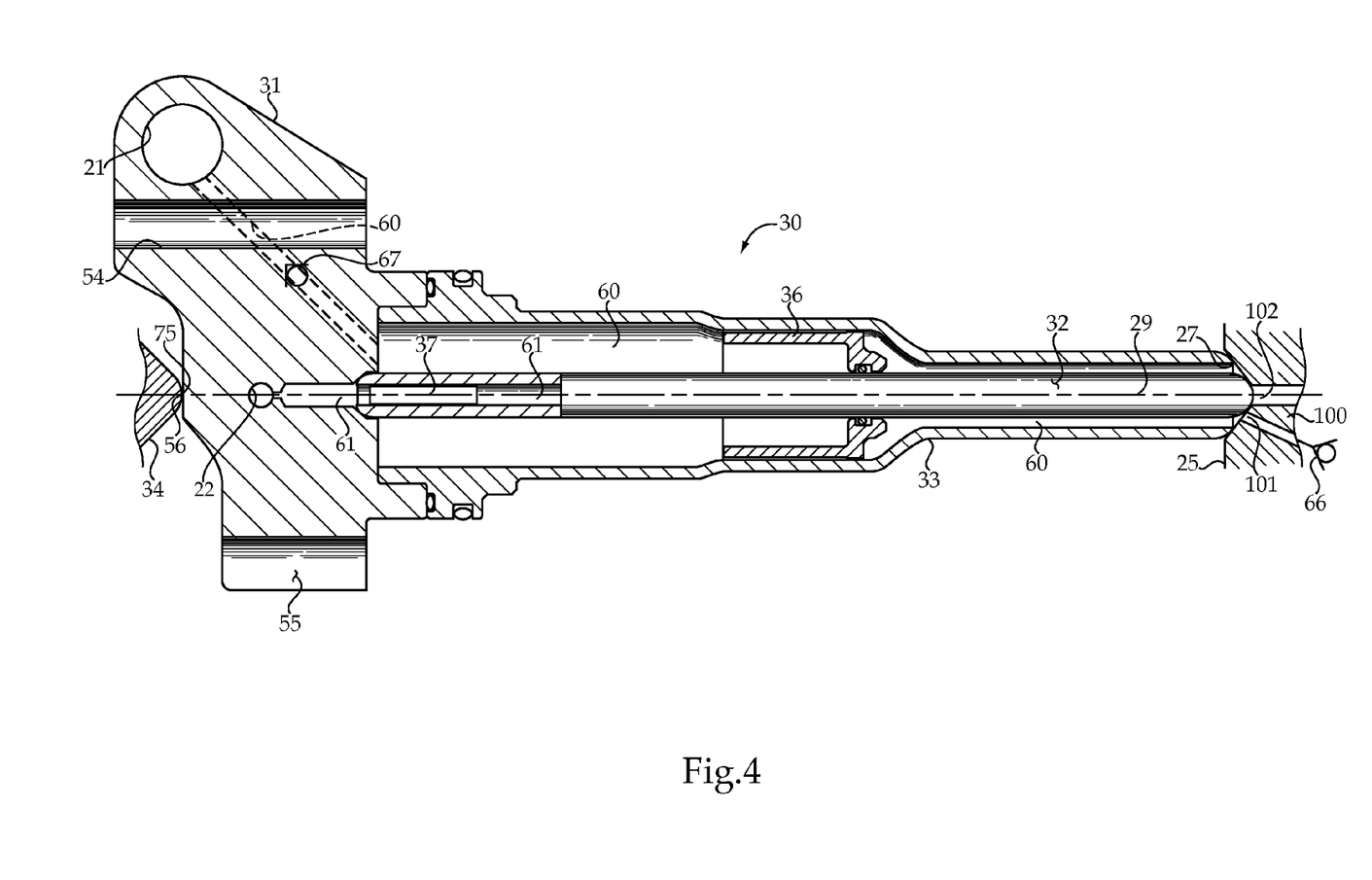
FIG. 4 is a sectioned side view through a co-axial quill assembly according to another aspect of the present disclosure.

Referring in addition to FIG. 4, the dual fuel common rail system 20 may include a co-axial quill assembly 30 with an inner quill 32 and an outer quill 33 in sealing contact with a common conical seat 27 of each fuel injector 25. The blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2. A coaxial quill assembly 30 is fluidly positioned between each of the plurality of fuel injectors 25 and each of the gaseous fuel common rail 21 and liquid fuel common rail 22.

Each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. The fasteners 80 and 81 are received in fastener bore 54 and fastener slot 55, respectively of blocks 31.

Each block 31 of each co-axial quill assembly 30 defines a segment of gaseous fuel common rail 21 that is oriented perpendicular to the axis 29 of inner quill 32. A gaseous fuel passage 60 opens at one end into gaseous fuel common rail 21 and opens at its other end into first fuel inlet 101 of fuel injector 25. A segment of gaseous fuel passage 60 is located between the inner quill 32 and the outer quill 33. Each of the blocks 31 also defines a segment of liquid fuel common rail 22. A liquid fuel passage 61 opens at one end into liquid fuel common rail 22, and opens at its opposite end into second fuel inlet 102 of fuel injector 25.

In order to trap metallic debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the inner quill 32. The gaseous fuel edge filter 36 is shown positioned within outer quill 33. Those skilled in the art will appreciate that the edge filters 36 and 37 could be located elsewhere, or omitted, without departing from the scope of this disclosure.

Figure 5:
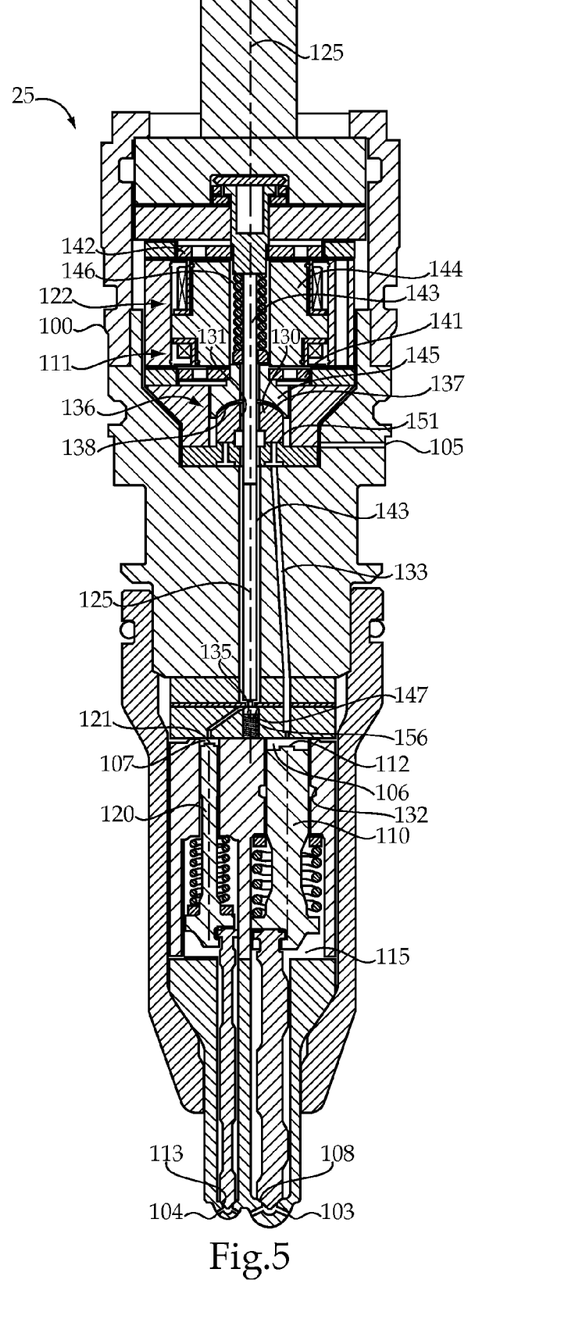
FIG. 5 is a sectioned front view of a fuel injector according to an aspect of the present disclosure.

Referring in addition to FIG. 5, a fuel injector 25 according to the present disclosure includes an injector body 100 that defines a first nozzle outlet set 103, a second nozzle outlet set 104 and a drain outlet 105. Injector body 100 also defines a first fuel inlet 101 and a second fuel inlet 102 that can be seen in the sectioned view of FIG. 4 opening through the common conical seat 27 of fuel injector 25. Disposed within injector body 100 are a first control chamber 106 and a second control chamber 107. A first check valve member 110 has a closing hydraulic surface 112 exposed to fluid pressure in the first control chamber 106. The first check valve member 110 is movable between a closed position, as shown, in contact with a first seat 108 to fluidly block the first fuel inlet 101 to the first nozzle outlet set 103, and an open position out of contact with the first seat 108 to fluidly connect the first fuel inlet 101 to the first nozzle outlet set 103 via a passage not visible in the sectioned view of FIG. 5. A second check valve member 120 has a closing hydraulic surface 121 exposed to fluid pressure in the second control chamber 107. The second check valve member 120 is movable between a closed position, as shown, in contact with a second seat 113 to fluidly block the second fuel inlet 102 to the second nozzle outlet set 104, and an open position out of contact with the second seat 113 to fluidly connect the second fuel inlet 102 to the second nozzle outlet set 104 via a passage not visible in the sectioned view of FIG. 5. Thus, injection of a first fuel (e.g., natural gas) through first nozzle outlet set 103 is facilitated by movement of first check valve member 110, while injection of a second fuel (e.g., liquid diesel) through second nozzle outlet set 104 is facilitated by movement of the second check valve member 120. Those skilled in the art will appreciate that the first and second nozzle outlet sets 103, 104 might be expected to each include six nozzle outlets that are arranged around respective centerlines in a manner well known in the art. However, nozzle outlet sets 103 and 104 could each include as few as one nozzle outlet or any number of nozzle outlets in any arrangement without departing from the present disclosure.

A first control valve member 130 is positioned in injector body 100 and is movable along a common centerline 125 between a first position in contact with flat seat 151 at which the first control chamber 106 is fluidly blocked to the drain outlet 105, and a second position at which the first control chamber 106 is fluidly connected to the drain outlet 105 via control passage 133. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in the injector body 100 and movable along the common centerline 125 between a first position in contact with flat seat 156 at which the second control chamber 107 is fluidly blocked to the drain outlet 105, and a second position out of contact with flat seat 156 at which the second control chamber 107 is fluidly connected to the drain outlet 105. When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through the second nozzle outlet set 104.

In the illustrated embodiment, the second control valve member 135 is intersected by the common centerline 125, but the first control valve member 130 defines a bore 131 therethrough that is concentric with common centerline 125. In the illustrated fuel injector 25, the respective control valve members 130, 135 may be moved to one of their respective first and second positions with first and second electrical actuators 111, 122, respectively. The control valve members 130, 135 may be biased to the other of their respective first and second positions by a spring(s) 146, 147. In particular, a first armature 141 may be attached to a pusher 145 in contact with first control valve member 130. The first armature 141, the pusher 145 and the first control valve member 130 may be biased to the position shown in contact with flat seat 151 by biasing spring 146. The control valve member 130 may rotate slightly about an axis perpendicular to common centerline 125 through the action of a self alignment feature 136 that allows convex surface 137 to move on a concave bearing surface 138 each time control valve member 130 contacts flat seat 151. Thus, first armature 141 can be thought of as being operably coupled to move the first control valve member 130, and a second armature 142 may be operably coupled to move the second control valve member 135 by way of a plurality of pushers 143. A common stator 144 separates the first armature 141 from the second armature 142.

The first control valve member 130 is in contact and out of contact with flat seat 151 at the first position and the second position, respectively. Likewise, the second control valve member 135 is in contact and out of contact with flat seat 156 at its first position and second position, respectively. Either, one or both of seats 151 and 156 may be a conical seat. First control valve member 130 may be coupled to move with first armature 141 responsive to de-energizing the lower coil mounted in common stator 144. When the lower coil mounted in common stator 144 is energized, armature 141 and pusher 145 are lifted upward allowing the high pressure in control passage 133 to push first control valve member 130 out of contact with flat seat 151 to fluidly connect control chamber 106 to drain outlet 105. First control chamber 106 and second control chamber 107 may always be fluidly connected to second fuel inlet 102 via passages not visible in the section view of FIG. 5. Thus, liquid diesel originating in second fuel inlet 102 may be utilized as the control fluid to control the operation of first check valve member 110 to facilitate gaseous fuel injection events and second member 120 to facilitate liquid fuel injection events.

A hydraulic lock seal 132 in the form of an annulus always fluidly connected to second fuel inlet 102 may be useful in inhibiting the migration of gaseous fuel from gaseous nozzle chamber 115 up into control chamber 106. Gaseous nozzle chamber 115 is always fluidly connected to first fuel inlet 101 via passages not visible in FIG. 5. Referring specifically to FIGS. 4 and 5, the present disclosure teaches a strategy to inhibit liquid fuel from migrating from the respective fuel injectors 25 toward gaseous fuel common rail 21 under certain conditions. When dual fuel common rail system 20 is operating in a regular mode, the liquid fuel common rail 22 may be maintained at a medium high pressure (e.g., maybe 40 MPa), and the gaseous fuel common rail 21 may be maintained at medium low pressure (e.g., maybe 35 MPa). This slight pressure differential is intended to inhibit leakage of gaseous fuel into the liquid fuel portions of fuel injector 25 and hence the entire dual fuel common rail fuel system 20. The inclusion of hydraulic lock seal 132 is another feature to inhibit gaseous fuel from migrating into the liquid fuel side of dual fuel common rail system 20. Nevertheless, one might expect some amount of leakage of liquid fuel into the gaseous fuel side of the system during regular mode of operation, but this small amount of leakage may be encouraged in order to facilitate proper lubrication of moving parts. For instance, a small of amount of liquid diesel fuel may leak from hydraulic lock seal 132 down into gaseous nozzle chamber 115 during a regular mode of operation. One could expect this small amount of liquid diesel to be ejected from nozzle outlet set 103 with each gaseous injection event. This small amount of leaked liquid diesel may serve to help lubricate the guiding movement of first check valve member 110 and the seat 108 during the regular mode of operation.

Dual fuel common rail fuel system may also have a single fuel mode of operation in which only liquid diesel fuel is utilized to power engine 10. This mode of operation may be referred to as a limp home mode, as this mode of operation may be preferable when the gaseous fuel supply is exhausted. When operating in a limp home mode, electronic controller 15 may maintain the liquid fuel common rail 22 at a high pressure (e.g., maybe 80 MPa), whereas the pressure in gaseous fuel common rail 21 may be allowed to decay, and may slowly drop as low as atmospheric pressure. During the limp home mode, engine 10 is operated as a conventional diesel engine in which liquid diesel fuel is injected through nozzle outlet set 104 in sufficient quantities and at timings to compression ignite. On the other hand, during the regular mode of operation, one might expect a relatively small pilot diesel liquid injection through nozzle outlet set 104 to be compression ignited to in turn ignite a much larger charge of gaseous fuel injected through nozzle outlet set 103 to power engine 10 in a regular mode of operation. Due to the higher pressure differential between the liquid fuel and the gaseous fuel that exists during the limp home mode of operation, one might expect more liquid fuel to leak into the gaseous side of dual fuel common rail system 20 than would leak during a regular mode of operation with a smaller pressure differential between the two fuels. Because little to no gaseous fuel is utilized during the limp home mode of operation, and because the leakage rate of liquid fuel into the gaseous fuel side is greater, the present disclosure teaches the inclusion of a check valve 66 or 67 to prevent built up leaked liquid diesel in gaseous nozzle chamber 115 from eventually reaching and entering the gaseous common rail 21. Referring specifically to FIG. 4, in one specific embodiment, a check valve 66 may be located in the passageway extending from first fuel inlet 101 to the gaseous nozzle chamber 115 within the individual fuel injector body 100. On the other hand, FIG. 4 also shows an alternative location in which the check valve 67 may be located in the gaseous fuel passage 60, such as within block 31. Those skilled in the art will appreciate that the check valve 66 or 67 blocks leaked liquid fuel from migrating to gaseous fuel common rail 21 during a limp home mode of operation, but is open and allows the free flow of gaseous fuel toward gaseous nozzle chamber 115 during the regular mode of operation.

Referring back to FIG. 1, although not necessary, dual fuel common rail system 20 may also include an electronically controlled isolation valve 46 operably positioned between the gaseous fuel supply and pressure control devices 16 and the gaseous fuel common rail 21. Isolation valve 46 may be mechanically biased toward a closed position but movable to an open position responsive to a control signal from electronic controller 15. When dual fuel common rail fuel system 20 is being operated in a regular mode, electronic controller 15 may maintain isolation valve 46 in an open position. However, in the event that the system transitions into a limp home mode of operation, the electronic controller 15 may close isolation valve 46 to fluidly isolate the gas supply and pressure control devices 16 from any leaked liquid diesel fuel that may find its way into the gaseous side of dual fuel common rail system 20.

The present disclosure recognizes that gaseous fuel and liquid fuel have different energy density values and thus some care should be taken when transitioning the dual fuel common rail system 20 from the limp home mode back to the regular mode of operation. An example scenario might be a mining truck that operates in a regular mode until its gaseous fuel supply is exhausted, at which point the engine 10 would transition into a single fueling mode or limp home mode of operation. After the liquefied natural gas tank 40 is refilled, there may be desire to transition back from the limp home mode to the regular mode to again supply engine 10 with both liquid diesel and natural gas fuels. The present disclosure recognizes that some care should be taken to purge or expel accumulated liquid diesel fuel in the gaseous nozzle chambers 115 of the individual fuel injectors 25 before commanding large gaseous fuel injection events. In other words, mistakenly injecting large amounts of liquid diesel fuel from the gaseous nozzle chambers 115 during a transition could upset the overall fueling logic causing a surge in engine speed cascading into a confused engine governor response. Thus, the present disclosure teaches a transition from the limp home mode to the regular mode by first commanding small injections of accumulated liquid diesel fuel from the gaseous nozzle chambers while maintaining desired engine power and a majority of fueling using liquid diesel fuel as in the limp home mode of operation. After detecting that all or most of the accumulated liquid fuel in the gaseous nozzle chambers 115 has been purged, the present disclosure teaches substituting increasing amounts of gaseous fuel injection for the liquid fuel injection quantities to continue maintaining the engine operating in a desired speed and load. As the gaseous fuel substitution strategy continues, the strategy will eventually arrive at a ratio of gaseous fuel to liquid diesel fuel that corresponds to operation in the regular mode. At this point, the logic may then transition into operating according to the regular mode in which a small pilot diesel quantity is compression ignited to in turn ignite a larger charge of injected gaseous fuel. When operating in the limp home mode, one could expect liquid fuel to accumulate in the gaseous nozzle chambers 115 of each fuel injector 25 of the dual fuel common rail system 20 over a plurality of engine cycles. This accumulated liquid fuel will be displaced by gaseous fuel when transitioning from the limp home mode to the regular mode. While transitioning, liquid fuel will continue to be injected from nozzle outlet set 104, and accumulated liquid fuel will be injected through gaseous nozzle outlet set 103 into the respective engine cylinders.

Transitioning from the limp home mode to the regular mode may include some measure to confirm that the accumulated liquid fuel has been injected before concluding the transition. For instance, one way of confirming that the accumulated liquid fuel has all been injected would be to detect the injection of gaseous fuel from the gaseous nozzle outlet set 103. Detection of the injection of gaseous fuel may be indirectly determined by measuring at least one of engine speed and engine torque responses to combustion events in each of the engine cylinders. For instance, for a given injection duration, and assuming equal volumes of liquid fuel and gaseous fuel, one could expect an engine speed or torque surge in the presence of a liquid diesel fuel being burned versus gaseous fuel. Thus, the gaseous injection control signals might be of a duration that yield measurable differences in engine speed and/or torque that would enable one to distinguish whether gaseous fuel or liquid fuel was injected.

In the illustrated embodiment, the first check valve member 110 and the second check valve member 120 move along respective lines that are each parallel to, but spaced apart from common centerline 125. Nevertheless, those skilled in the art will appreciate that the structure could be different. For instance, dual concentric check valve members that were concentric with common centerline 125 would also fall within the scope of the present disclosure.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure also applies to a dual fuel common rail system with the ability to operate in a regular mode utilizing both fuels, and also a limp home mode in which the engine is fueled only by a single one of the fuels. For instance, a limp home mode might correspond to utilizing liquid diesel fuel due to a lack of gaseous fuel availability. The present disclosure applies specifically to a strategy to transition from the single fueling limp home mode to the dual fueling regular mode.

Referring back to all of the FIGS. 1-5, a method of operating dual fuel engine 10 begins by assembling a dual fuel common rail system 20 to an engine housing 11. Gaseous fuel is supplied from the gaseous fuel common rail 21 to each of the plurality of fuel injectors 25 by a respective co-axial quill assembly 30. Likewise, liquid fuel from a liquid fuel common rail 22 is supplied to each of the plurality of fuel injectors 25 by the same respective co-axial quill assemblies 30. When in the regular mode of operation, gaseous fuel is injected from each fuel injector 25 into an engine cylinder 12 responsive to a gaseous fuel injection signal communicated from electronic engine controller 15 to the fuel injector 25. Liquid fuel from the fuel injector 25 is injected directly into engine cylinder 12 from the same fuel injector 25 responsive to a liquid fuel injection signal from electronic engine controller 15.

A method of operating dual fuel engine 10 includes operating dual fuel system 20 in a regular mode preferably most of the time. Preferably a minority of the time, the dual fuel common rail system 20 will be operated in a limp home mode, which could be attributable to an exhausted gaseous fuel supply or maybe some fault in the gaseous fuel system causing a switch over into a single fueling mode. When operating in the regular mode, the liquid fuel is injected from the liquid nozzle outlet set 104 and gaseous fuel is injected from the gaseous nozzle outlet set 103 into an engine cylinder 12. When operating dual fuel common rail system 20 in the limp home mode, liquid fuel is injected from the liquid nozzle outlet set 104, but gaseous fuel is not injected from the gaseous nozzle outlet set 103 into the engine cylinder 12. When operating in the limp home mode, the electronic controller 15 will act to maintain a ratio of the liquid common rail pressure to the gaseous common rail pressure high, but maintain that ratio low when operating the dual fuel common rail system 10 in the regular mode. When operating in the limp home mode, the check valve(s) 66, 67 will be effective in blocking leaked liquid fuel from reaching the gaseous fuel common rail 21. If equipped with an isolation valve 46, the method of operating may include isolating the gaseous fuel supply and pressure control devices 16 from the gaseous fuel common rail 21 in the limp home mode, but not in the regular mode.

Figure 6:
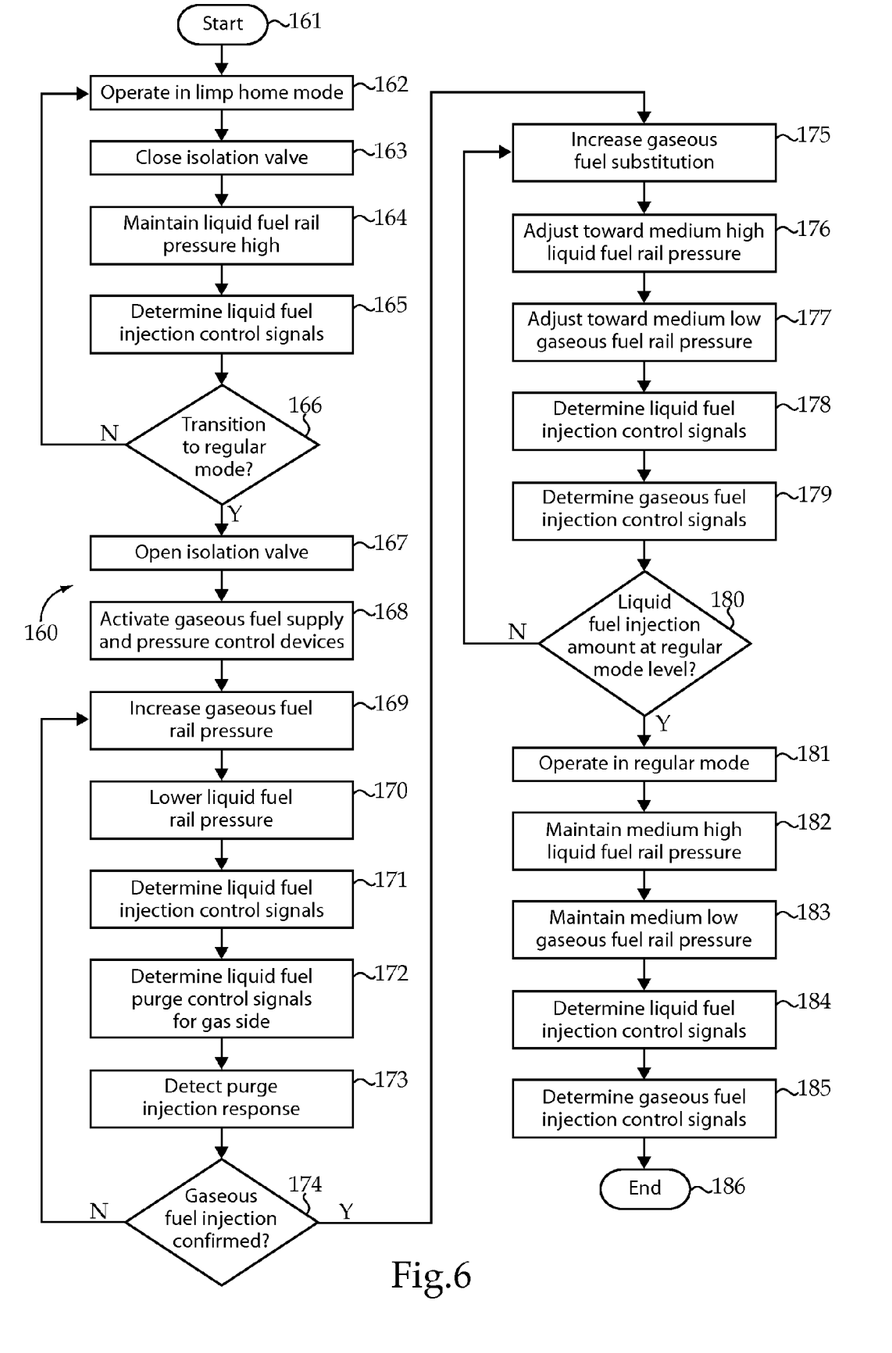
FIG. 6 is a logic flow diagram showing a method of transitioning from a limp home mode to a regular mode of operation.

Referring now specifically to FIG. 6, one example fueling transition control algorithm 160 according to the present disclosure is illustrated. The algorithm starts at oval 161 and proceeds to block 162 for operation in the limp home mode. At block 163 the isolation valve 46 is closed. At block 164 liquid fuel rail pressure is maintained high, such as maybe 80 MPa. At query 166 the logic determines whether to transition to the regular mode. If not, the logic loops back to block 162 to continue operation in the limp home mode. If query 166 returns an affirmative, the logic advances to block 167 where the isolation valve 46 is opened. Next, the gaseous fuel supply and pressure control devices are activated at block 168 to begin supplying gaseous fuel common rail 21. At block 169, the gaseous fuel rail pressure is raised. At block 170, the liquid fuel rail pressure is lowered. For instance, the gaseous fuel common rail 21 may be raised toward or slightly above its regular operating pressure of maybe 35 MPa. On the otherhand, the liquid rail pressure may begin being lowered incrementally from 80 MPa toward the regular mode pressure, which may correspond to 40 MPa. Depending upon hardware and preferences and other considerations, the liquid fuel rail pressure may be maintained at its high level and not lowered until later in the transition. At block 171, electronic controller 15 determines and communicates liquid fuel injection control signals. In addition, at block 172, the logic will determine and communicate liquid fuel purge control signals for the gas side of fuel system 20. For instance, electronic controller 15 might command a gaseous fuel injection control signal to open the gaseous nozzle outlet set 103 to inject a small quantity of the accumulated liquid diesel fuel in gaseous nozzle chamber 115. The duration of these purge injection events may be relatively short so that the injection quantity is small, but be of sufficient duration that one may detect directly or indirectly whether liquid or gaseous fuel has been injected from the gaseous nozzle outlet sets 103. This detection may occur at block 173, such as by monitoring engine speed and/or torque responsive to combustion events that are associated with the injection of the accumulated liquid fuel from block 172. At query 174, the logic asks whether gaseous fuel injection has been confirmed. In other words, if the detection step 173 detects that gaseous fuel is now being injected instead of liquid diesel, the query 174 will return an affirmative response. On the otherhand, if the logic continues to detect liquid fuel injection of remaining accumulated liquid diesel fuel, the query 174 will return a negative and loop back to block 169 to continue increasing gaseous fuel rail pressure. The portion of the logic 169-174 may continue with small short duration injections until the logic confirms that all of the accumulated liquid diesel fuel has been purged from the gaseous nozzle chambers 115 of all fuel injectors 25. In parallel, the engine will continue to be powered at a desired level through relatively large injections of liquid diesel fuel from liquid nozzle outlet sets 104 as if the engine were continuing to operate essentially in the limp home mode.

While the transition may occur at a low load or maybe even an idle condition, the logic may be prepared to continue operation at some elevated load and speed condition as well. After successfully confirming that the accumulated liquid diesel fuel has been injected and that gaseous fuel is now being injected from the gaseous nozzle outlet sets 103, the logic will advance to block 175 and begin substituting gaseous fuel for the liquid fuel necessary to maintain the desired engine speed and load. Block 176, the logic will adjust the liquid fuel pressure toward a medium high pressure, such as 40 MPa associated with the regular mode of operation. At block 177, the gaseous fuel rail pressure will be adjusted toward a medium low level, such as 35 MPa corresponding to the regular mode. At block 178, electronic controller 15 will determine and communicate liquid fuel injection control signals. At block 179, the electronic controller will determine and communicate gaseous fuel injection control signals. During this portion of the logic, and in accordance with block 175, the ratio of gaseous fuel injection to liquid fuel injection may increase in successive engine cycles with each time that query 180 returns a negative result and returns the logic back to block 175. At query 180, the logic will determine whether the substitution of gaseous fuel for liquid fuel has arrived at a level in which the liquid fuel injection amount corresponds to the regular mode level. In other words, during the regular mode only a small pilot liquid diesel injection quantity may be desired in order to ignite a much larger charge of gaseous fuel that provides the bulk of the fueling of the engine during the regular mode of operation. If query 180 returns an affirmative, the logic advances to block 181 and the engine is re-rated and is now operating in the regular mode. The engine can be considered to be derated while operating in the limp home mode, as full rated engine power may not be available. At block 182, the logic will maintain the liquid fuel rail pressure at a medium high level, and at block 183 maintain the gaseous fuel rail pressure at a medium low level. Thus, when the common rail fuel system 20 is being operated in a limp home mode, the ratio of the liquid fuel common rail pressure to the gaseous fuel common rail pressure will be high. On the otherhand, when the system 20 is being operated in the regular mode, the ratio of liquid common rail pressure to gaseous common rail pressure will be maintained low. At block 184, the logic will determine and communicate liquid fuel injection control signals, such as the small pilot injection quantities necessary to compression ignite the larger charge of gaseous fuel that is provided in response to the determination and communication of gaseous fuel injection control signals at block 185. At oval 186 the logic ends.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method of operating a dual fuel engine, comprising the steps of:
    operating a dual fuel system in a regular mode;
    operating the dual fuel system in a limp home mode;
    accumulating liquid fuel in a gaseous nozzle chamber of each fuel injector of the dual fuel system over a plurality of engine cycles when operating in the limp home mode;
    transitioning from the limp home mode to the regular mode by displacing the accumulated liquid fuel with gaseous fuel;
    injecting liquid fuel from a first nozzle outlet set and gaseous fuel from a second nozzle outlet set into an engine cylinder when operating the dual fuel system in the regular mode;
    injecting liquid fuel from a first nozzle outlet set but not injecting gaseous fuel from the second nozzle outlet set into the engine cylinder when operating the dual fuel system in the limp home mode; and
    injecting liquid fuel from a first nozzle outlet set and injecting the accumulated liquid fuel from the second nozzle outlet set into the engine cylinder during the transitioning step.

2. The method of claim 1 wherein the transitioning step includes confirming that the accumulated liquid fuel has been injected before concluding the transitioning step.

3. The method of claim 2 wherein the confirming step includes detecting injection of gaseous fuel from the second nozzle outlet set.

4. The method of claim 3 wherein the determining step includes measuring at least one of an engine speed and an engine torque responses to combustion events in each of the engine cylinders.

5. The method of claim 1 including the steps of:
    maintaining a ratio of liquid common rail pressure to gaseous common rail pressure high when operating the dual fuel system in the limp home mode;
    maintaining the ratio of liquid common rail pressure to gaseous common rail pressure low when operating the dual fuel system in the regular mode.

6. The method of claim 1 including a step of blocking movement of liquid fuel into the gaseous common rail.

7. The method of claim 1 wherein the transitioning step includes:
    opening an isolation valve that fluidly separates a gaseous fuel supply and pressure control system from the gaseous common rail; and
    raising pressure in the gaseous fuel common rail.

8. The method of claim 1 wherein the transitioning step includes substituting gaseous fuel injection for liquid fuel injection for fueling in each of the engine cylinders.

9. The method of claim 8 wherein the substituting step includes increasing a ratio of gaseous fuel injection to liquid fuel injection in successive engine cycles.

10. The method of claim 1 wherein the transitioning step includes decreasing pressure in a liquid fuel common rail.

11. A dual fuel common rail system comprising:
    a gaseous fuel common rail;
    a liquid fuel common rail;
    a plurality of fuel injectors each fluidly connected to each of the gaseous fuel common rail and the liquid fuel common rail;

a liquid fuel supply and pressure control system fluidly connected to the liquid fuel common rail;

a gaseous fuel supply and pressure control system fluidly connected to the gaseous fuel common rail;

an electronic controller in control communication with the plurality of fuel injectors, the liquid fuel supply and pressure control system and the gaseous fuel supply and pressure control system, and including a limp home algorithm configured to communicate liquid injection control signals to inject liquid fuel from a first nozzle outlet set and gaseous injection control signals to inject liquid fuel from a second outlet set, and including a regular algorithm configured to communicate liquid injection control signals to inject liquid fuel from the first nozzle outlet set, and further including a transitioning algorithm configured to generate gaseous injection control signals to inject accumulated liquid fuel in a gaseous nozzle chamber of each of the fuel injectors from the second outlet set.

12. The dual fuel common rail system of claim 11 wherein the limp home algorithm is configured to maintain a ratio of liquid common rail pressure to gaseous common rail pressure high;

wherein the regular algorithm is configured to maintain the ratio of liquid common rail pressure to gaseous common rail pressure low.

13. The dual fuel common rail system of claim 12 including a check valve operably positioned to block movement of liquid fuel from each of the plurality of fuel injectors to the gaseous common rail.

14. The dual fuel common rail system of claim 13 including an electronically controlled isolation valve operably positioned between the gaseous fuel supply and pressure control system and the gaseous common rail.

15. The dual fuel common rail system of claim 14 wherein the transitioning algorithm is configured to generate an isolation valve open signal to open the isolation valve, and generate a gaseous rail pressure control signal to raise pressure in the gaseous fuel common rail.

16. The dual fuel common rail system of claim 15 wherein the transitioning algorithm is also configured to change successive liquid injection control signals and gaseous injection control signals to substitute gaseous fuel injection for liquid fuel injection from each of the fuel injectors.

17. The dual fuel common rail system of claim 16 wherein transitioning algorithm is also configured to change successive liquid injection control signals and gaseous injection control signals to increase a ratio of gaseous fuel injection to liquid fuel injection in successive engine cycles.

18. The dual fuel common rail system of claim 17 wherein the transitioning algorithm is also configured to generate a liquid rail pressure control signal to decrease pressure in the liquid fuel common rail.

19. The dual fuel common rail system of claim 18 wherein the transitioning algorithm is also configured to detect injection of gaseous fuel from the second nozzle outlet set of each of the fuel injectors.

20. The dual fuel common rail system of claim 11 including a coaxial quill assembly fluidly positioned between each of the plurality of fuel injectors and each of the gaseous common rail and the liquid common rail.

* * * * *